(12) United States Patent
Guitton et al.

(10) Patent No.: US 10,787,264 B2
(45) Date of Patent: Sep. 29, 2020

(54) VIBRATION FILTER MECHANISM FOR ARRANGING BETWEEN A PIECE OF EQUIPMENT AND AN AIRCRAFT FUSELAGE, AND A SEAT FITTED WITH SUCH A MECHANISM

(71) Applicants: AIRBUS HELICOPTERS, Marignane (FR); AIRBUS HELICOPTERS DEUTSCHLAND GMBH, Donauworth (DE)

(72) Inventors: Julien Guitton, Chateauneuf les Martigues (FR); Anne-Claire Chapuis-Desplanques, Saint Chamas (FR); Ambrosius Weiss, Augsburg (DE); Thomas Manfredotti, La Colle sur Loup (FR)

(73) Assignees: AIRBUS HELICOPTERS, Marignane (FR); AIRBUS HELICOPTERS DEUTSCHLAND GMBH, Donauworth (DE)

( * ) Notice: Subject to any disclaimer, the term of this patent is extended or adjusted under 35 U.S.C. 154(b) by 328 days.

(21) Appl. No.: 15/964,149

(22) Filed: Apr. 27, 2018

(65) Prior Publication Data

US 2018/0312259 A1    Nov. 1, 2018

(30) Foreign Application Priority Data

Apr. 28, 2017   (FR) ...................................... 17 70436

(51) Int. Cl.
 *B64D 11/06*   (2006.01)
 *F16F 7/116*   (2006.01)

(52) U.S. Cl.
 CPC .......... *B64D 11/0696* (2013.01); *F16F 7/116* (2013.01)

(58) Field of Classification Search
 CPC ............ B64C 27/001; B64C 2027/005; B64D 11/0619; F16F 7/116
 See application file for complete search history.

(56) References Cited

U.S. PATENT DOCUMENTS

| 4,311,213 A | 1/1982 | Desjardins et al. |
| 4,718,719 A | 1/1988 | Brennan |

(Continued)

FOREIGN PATENT DOCUMENTS

| DE | 102008052424 A1 | 4/2010 |
| EP | 1719700 A2 | 11/2006 |

(Continued)

OTHER PUBLICATIONS

Notice of Preliminary Rejection for Korean Application No. 10-2018-0049349, dated Jun. 21, 2019, 4 pages.

*Primary Examiner* — Richard G Davis
(74) *Attorney, Agent, or Firm* — Brooks Kushman P.C.

(57) ABSTRACT

A vibration filter mechanism between a fuselage and a piece of equipment of the aircraft. The filter mechanism comprises a pair of filter members, each secured with a first structure that is to be connected to the fuselage and with a second structure of the piece of equipment. Each filter member is secured with the first structure via a first pivot type connection having one degree of freedom to move in rotation and with the second structure via a second pivot type connection having one degree of freedom to move in rotation. The filter mechanism includes resilient return means for deforming during relative movement in rotation between at least one of the filter members and the first structure. The resilient return means presents a predetermined stiffness suitable for generating a return force opposing the relative movement in rotation between at least one of the filter members and the first structure.

13 Claims, 4 Drawing Sheets

(56) References Cited

U.S. PATENT DOCUMENTS

| | | |
|---|---|---|
| 7,461,729 B2 | 12/2008 | Manfredotti et al. |
| 7,731,287 B2 | 6/2010 | Manfredotti |
| 8,636,121 B2 | 1/2014 | Manfredotti et al. |

FOREIGN PATENT DOCUMENTS

| | | |
|---|---|---|
| FR | 2863966 A1 | 6/2005 |
| FR | 2951700 A1 | 4/2011 |
| WO | 2014058401 A2 | 4/2014 |
| WO | 2014058401 A3 | 4/2014 |

VIBRATION FILTER MECHANISM FOR ARRANGING BETWEEN A PIECE OF EQUIPMENT AND AN AIRCRAFT FUSELAGE, AND A SEAT FITTED WITH SUCH A MECHANISM

CROSS-REFERENCE TO RELATED APPLICATIONS

This application claims priority to French patent application No. FR 1770436 filed on Apr. 28, 2017, the disclosure of which is incorporated in its entirety by reference herein.

BACKGROUND OF THE INVENTION

(1) Field of the Invention

The present invention relates to the field of antivibration mechanisms for filtering dynamic forces coming from a fuselage of an aircraft in general and of a rotorcraft in particular, and transmitted to a piece of equipment secured to said fuselage.

2) Description of Related Art

In a rotorcraft, the fuselage is subjected to excitation at many frequencies as a function of the frequency of rotation and of the number of blades of the main rotor that provides lift and possibly also propulsion. In principle, the vibration filter mechanism is designed for a given frequency, namely the frequency that is equal to the product of multiplying said frequency of rotation of the rotor by the number of its blades.

More precisely, in the invention, the idea is to couple the movement of a moving mass secured to the piece of equipment in order to counter the dynamic forces (excitation) by inertial effects.

Such filter mechanisms also act in at least one direction to filter vibration that is transmitted to a piece of equipment, which may in particular be in the form of a seat suitable for receiving a member of the crew or a passenger in such an aircraft in order to provide acceptable comfort. Under such circumstances, the vibration filter mechanisms are preferably arranged to filter vibration that is oriented along an axis in elevation that is perpendicular relative to the floor of such an aircraft.

In general manner, it is known to make such mechanisms suitable for filtering vibration transmitted to a piece of equipment. Mechanisms of this type are described in particular in the following documents: U.S. Pat. No. 4,718,719, U.S. Pat. No. 4,311,213, WO 2014/058401, and DE 10 2008 052 424, or indeed by the Applicant in the documents FR 2 951 700 and EP 1 719 700. As explained in those documents, the vibration generated by a moving aircraft is particularly important and is generally of low amplitude and at high frequency, e.g. of the order of 10 hertz (Hz) to 25 Hz.

Such vibration is problematic both for the fatigue lifetime of the equipment and also for the comfort or indeed the health of people who are regularly subjected to such levels of equipment at low amplitude and high frequency.

Although the vibration filter mechanisms as described in Documents FR 2 951 700 and EP 1 719 700 are particularly effective for filtering such vibration oriented along the axis in elevation, they are nevertheless complex to make. Specifically, such mechanisms comprise a large number of mutually distinct parts. Thus, when fabricating such filter mechanisms, an operator needs to identify individually each one of those parts and then assemble them to one another using additional fastener members.

Furthermore, such mechanisms each comprise two filter members each secured firstly to a first structure connected to the fuselage of the aircraft and secondly to a second structure secured to the equipment. Those mechanisms also include additional resilient return means assembled with both filter members. The resilient return means then present predetermined stiffness and make it possible to generate a return force opposing relative movement in rotation of at least one filter member relative to the first structure.

In addition, such resilient return means may be constituted by spring blades 41 as described in Document EP 1 719 700 or by torsion shafts 24 as described in Document FR 2 951 700.

That large number of parts for fastening together thus makes such filter mechanisms complicated, and lengthy and expensive to assemble.

Furthermore, given the large number of different parts and the additional fastener members that they include, such filter mechanisms are very heavy and give rise to a large increase in weight on board an aircraft that generally has a plurality of pieces of equipment with which such filter mechanisms can be coupled.

Consequently, although such filter mechanisms can improve the comfort and the lifetime of pieces of equipment subjected to vibration of low amplitude and high frequency, they nevertheless considerably degrade the flight performance of the aircraft on which they are arranged.

BRIEF SUMMARY OF THE INVENTION

An object of the present invention is thus to propose a filter mechanism making it possible to overcome the above-mentioned limitations. Such a filter mechanism has a limited number of parts and consequently it is simple to assemble with a piece of equipment. A filter mechanism of the invention is therefore inexpensive to produce.

Furthermore, another object of the invention is to limit the weight and the size of that type of vibration filter mechanism so as to avoid degrading the flight performance of an aircraft to which it is fitted. The invention thus provides a vibration filter mechanism for arranging at the interface between a fuselage of an aircraft and a piece of equipment of the aircraft, the filter mechanism comprising a pair of filter members each secured respectively firstly with a first structure that is to be connected to the fuselage and secondly with a second structure of the piece of equipment, each filter member being secured with the first structure via a first pivot type connection having one degree of freedom to move in rotation and with the second structure via a second pivot type connection having one degree of freedom to move in rotation, the filter mechanism including resilient return means suitable for deforming during relative movement in rotation between at least one of the filter members and the first structure, the resilient return means presenting predetermined stiffness suitable for generating a return force opposing the relative movement in rotation between the filter member(s) and the first structure.

This mechanism is remarkable in that the filter members co-operate with the resilient return means to form an elastically deformable one-piece unit.

In other words, in the invention, the filter members and the resilient return means are arranged in the form of a single one-piece part having a capacity for elastic deformation. Thus, while the aircraft is in operation, vibration between the fuselage and the piece of equipment is filtered by the elastic deformation of this one-piece unit.

Consequently, such a one-piece unit does not include any fastener member for fastening the filter members to the resilient return means. Such a filter mechanism is thus simpler to assemble, and is also lighter in weight.

The one-piece unit may in particular be formed by a part obtained by a machining/cutting method serving to remove material from a block made of a single material. The one-piece unit may also be made using a method of molding or injecting a liquid or pasty material into a mold. Such a one-piece unit may also be made by a method of additive fabrication or by three-dimensional printing, serving in particular to make one-piece parts of shapes that are particularly complex to fabricate with more conventional methods.

Advantageously, the resilient return means may comprise a group of four fins connected together and arranged parallel to one another in order to define an H-shape, each of the four fins having a proximal end and a distal end, each fin being suitable for deforming at least in bending and in twisting between the proximal end and the distal end during the relative movement in rotation between the filter member(s) and the first structure, the four fins being secured to one another via their respective proximal ends to form a junction zone.

In other words, the four fins that are connected together in the junction zone serve directly to secure the two filter members to each other. These two filter members are suitable for moving in rotation relative to the first structure by the four fins deforming between their distal ends and their proximal ends.

Advantageously, the H-shape defined by the four fins may be arranged in a plane parallel to a plane defined by two axes of rotation of the first pivot type connections respectively between each filter member and the first structure.

Thus, the junction zone formed by the central portion of the H-shape extends in a longitudinal direction corresponding to a direction extending between a front zone and a rear zone of the piece of equipment. Furthermore, such a junction zone is oriented substantially perpendicularly to a transverse direction corresponding to a direction extending between a left lateral zone and a right lateral zone of the piece of equipment.

In practice, the four respective fins may be of the same length.

In this manner, the junction zone is then arranged at an anteroposterior plane of symmetry of the mechanism, and each pair of fins secured to the same filter member can deform symmetrically relative to the anteroposterior plane of symmetry.

In an advantageous embodiment of the invention, each of the four fins may have a respective cross-section of shape selected in particular from the group comprising shapes that are: square, rectangular, prismatic, I-shaped, H-shaped, elliptical, and round.

Selecting such shapes for the cross-section of the fins serves in particular to adapt the second moment of area of the cross-section of the fins, where, in the field of the strength of materials, the second moment of area (or "inertia") is a magnitude that is characteristic of the shape of a section and is defined relative to an axis or to a point. Such a second moment of area then makes it possible to calculate the strength and the deformation of the beams when stressed in twisting and in bending. Thus, selecting such shapes for the cross-section of the fins makes it possible to adapt the capacity of the fins to deform during relative movement in rotation between the filter member(s) and the first structure.

Advantageously, the four fins may have respective cross-sections of the same shape.

Thus, the four fins may have the same second moment of area and may deform in similar manner, providing they are also of the same length.

In practice, each filter member may have two branches and at least one crossbeam connecting together the two branches, the two branches also being connected together by two mutually opposite fins and forming a portion of the group of four fins, the two opposite fins being arranged on common axes on either side of the junction zone.

In other words, each filter member may have a large through orifice arranged between the two branches. In addition, such an arrangement serves to avoid pointlessly increasing the weight of the filter mechanism formed in this way. Consequently, the distal ends of two opposite fins cooperate with the two branches and can be arranged substantially parallel relative to the crossbeam(s).

In an advantageous embodiment of the invention, each crossbeam may include at least one recess, and each filter member may include at least one inertial mass fitted in the recess(es).

In other words, an auxiliary inertial mass may be added and secured with each filter member in such a manner as to enable the frequency range of the vibration filter mechanism to be matched to the range of the vibration that is to be absorbed as a function of the piece of equipment with which the mechanism is associated, or indeed as a function of the aircraft in which such a piece of equipment is arranged. Specifically, by modifying the mass of the inertial mass, it becomes possible to modify the vibration absorption behavior of such a filter mechanism.

Such an inertial mass may particular be in the form of one or more metal blades stacked on one another in the recess. Specifically, by adding metal blades to a filter member or by removing them therefrom, the resonant frequency of the system can be matched to the aircraft or to the type of equipment on which such a filter mechanism is fitted.

In addition, such metal blades may be secured by bolts passing through holes of complementary shape arranged in the crossbeam(s).

Such metal blades may advantageously be made in a material of high density such as steel or cast iron, while the filter members may advantageously be made of aluminum, for example.

Furthermore, depending on the type of aircraft, on the direction of the vibration to be filtered, and/or on the amplitude or the frequency range of the vibration to be absorbed, the filter mechanism may be in various particular forms.

Thus, in a first embodiment of the invention, the two branches of a first filter member and the two branches of a second filter member may be of the same length.

In other words, the filter members may be similar and arranged symmetrically relative to the junction zone connecting them together.

Thus, in a second embodiment of the invention, the two branches of a first filter member and the two branches of a second filter member may be of different lengths.

Under such circumstances, the two filter members are then not arranged symmetrically relative to the junction zone. Such an arrangement may serve in particular to reduce the overall weight of the filter mechanism by increasing the length of the branches of one of the two filter members relative to the other, and thus increasing the lever arm with which forces are transmitted from a filter member to the piece of equipment.

The present invention also provides a seat constituting a piece of equipment provided with at least one above-specified vibration filter mechanism.

According to the invention, the first structure has four independent feet, each foot including firstly a plane base for securing via a fixed connection with a floor of the fuselage, and secondly first rotary guide means suitable for forming all or part of the first pivot type connection having one degree of freedom to move in rotation between two zones on a common axis of each filter member and each foot. Where the term "fixed connection" is used herein to cover any connection of the type having no degree of freedom to move, eg. welded, bolted, etc.

In other words, the four feet may be fitted in contact with the floor of the fuselage of an aircraft and may be held stationary by means of reversible fastener members, such as nuts, bolts, or the like. Furthermore, the first rotary guide means may include silentblocks constituted completely or in part of a flexible material such as rubber and serving to absorb shocks and vibration between the first structure and the filter members, in particular along a longitudinal or transverse direction, i.e. lying substantially in a plane defined by the floor of an aircraft.

Such first rotary guide means may also be made as bearings such as the rings made of a material having a low coefficient of friction, or indeed ball bearings or needle bearings.

In practice, the second structure of the seat may have two L-shaped brackets, and four intermediate connection parts, each bracket comprising firstly an upright in elevation secured by a fixed connection with a bucket of the seat, and secondly a horizontal spar secured by a fixed connection with two intermediate connection parts arranged respectively at a front end of each horizontal spar and at a rear end of each horizontal spar, the two intermediate connection parts secured to the same horizontal spar each co-operating with distinct filter members, each intermediate connection part including second rotary guide means suitable for forming all or part of the second pivot type connection having one degree of freedom to move in rotation between each filter member and the front and rear ends of each horizontal spar.

Consequently, the four intermediate connection parts may be kept stationary relative to the two horizontal spas by means of reversible fastener members such as nuts, bolts, or the like. Furthermore, the second rotary guide means may include silentblocks constituted in full or in part of a flexible material such as rubber serving to absorb shocks and vibration between the second structure and the filter members, in particular in longitudinal or transverse directions, as defined above.

Such second rotary guide means may also be made as bearings such as the rings made of a material having a low coefficient of friction, or indeed ball bearings or needle bearings.

In an advantageous embodiment of the invention, each intermediate connection part may include abutment means suitable for limiting the movement in rotation of the filter members relative to the four independent feet, the abutment means of each intermediate connection part co-operating with a respective through orifice formed within each foot.

Such abutment means may thus be arranged in each foot and, by way of example, each of them may be respectively in the form of a pin passing through a through orifice. By deforming elastically, such abutment means can also serve to absorb a portion of the kinetic energy during an accident to the aircraft.

BRIEF DESCRIPTION OF THE DRAWINGS

The invention and its advantages appear in greater detail from the context of the following description of examples given by way of illustration and with reference to the accompanying figures, in which.

Elements present in more than one of the figures are given the same references in each of them.

DETAILED DESCRIPTION OF THE INVENTION

Three mutually orthogonal directions X, Y, and Z are shown in FIGS. 1 to 6.

The direction X is said to be longitudinal insofar as the term "length" relates to a longitudinal dimension of the equipment and of the filter mechanism in that longitudinal direction X.

Another direction Y is said to be transverse. The term "width" relates to a transverse dimension of the device in that transverse direction.

Finally, a third direction Z is said to be in elevation and corresponds to the height dimensions of the structures described. The term "thickness" then relates to a dimension in elevation of the device in this elevation direction.

As mentioned above, the invention relates to a vibration filter mechanism for arranging in an aircraft, and to a piece of equipment for aircraft, in particular such as a seat, that is fitted with the vibration filter mechanism.

Figure 1:
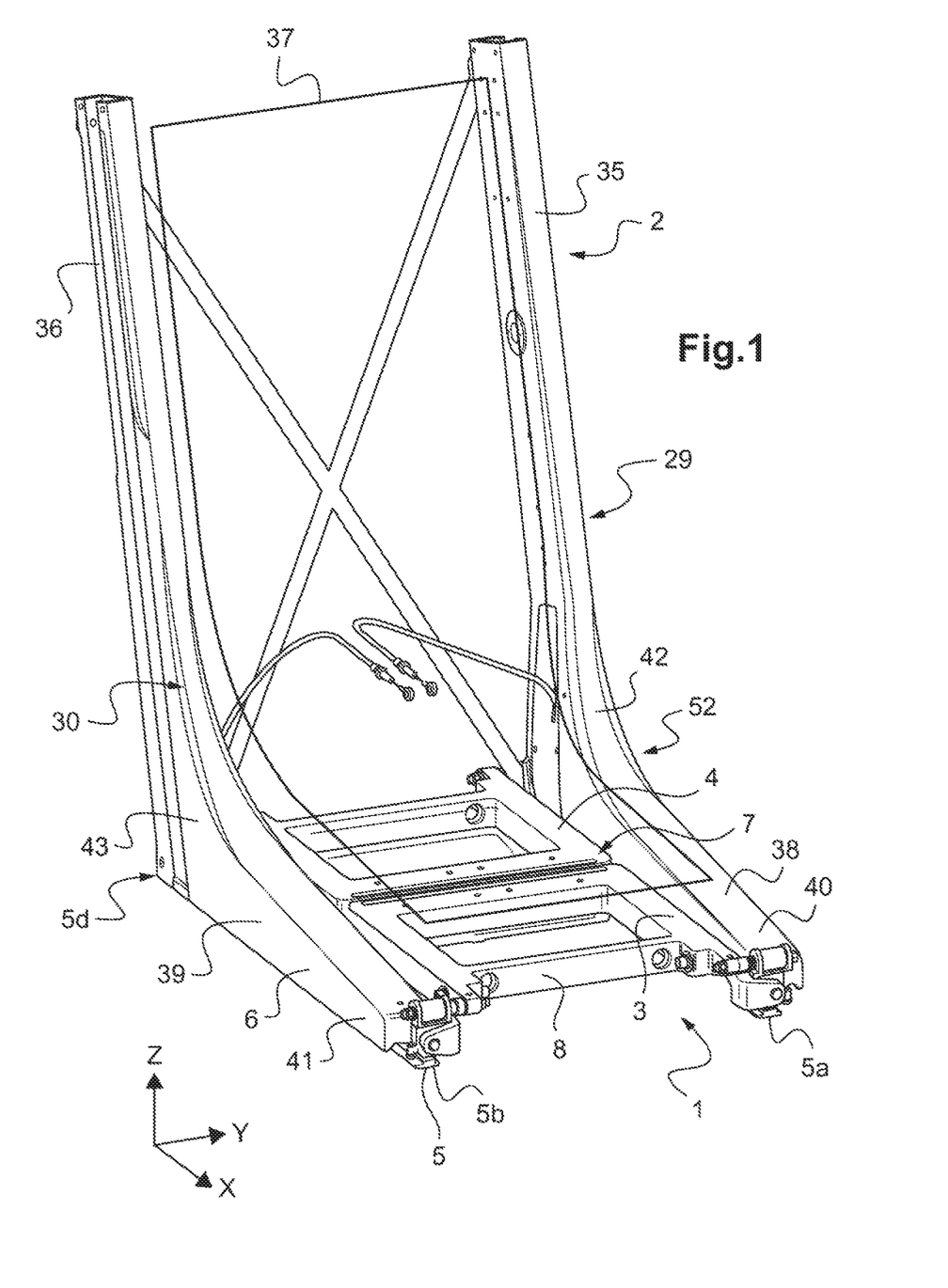
FIG. 1 is a perspective view of a piece of equipment fitted with a filter mechanism in a first variant in accordance with the invention.

As shown in FIG. 1, a seat 2 may be fitted with a filter mechanism 1 in a first variant in order to filter the vibration transmitted to the seat 2 by a fuselage of an aircraft, such as an airplane or a rotorcraft, in particular.

In addition, such a seat 2 comprises at least one bucket 37 serving as a pan and a back for a passenger or a pilot of the aircraft. Such a bucket 37 is then assembled with and secured to two L-shaped brackets 29 and 30, each having a respective upright 35, 36 in elevation extending substantially along the elevation direction Z, and a respective horizontal spar 38, 39 extending substantially along the longitudinal direction X.

Such a seat 2 is then fitted with a filter mechanism 1 in a first variant comprising a pair of filter members 3 and 4, each secured respectively firstly with a first structure 5 that is for connection to the fuselage of the aircraft and secondly with a second structure 6 of the seat 2 that includes the two brackets 29 and 30.

The two filter members 3 and 4 are then each respectively secured with first structure 5 via a first pivot type connection having one degree of freedom to move in rotation and with the second structure 6 via a second pivot type connection having one degree of freedom to move in rotation.

Each second pivot type connection having one degree of freedom to move in rotation is then provided respectively at the front ends 40, 41, and at the rear ends 42, 43 of the horizontal spars 38 and 39 of the two brackets 29 and 30.

Furthermore, such a filter mechanism 1 also has resilient return means 7 having capacity to deform during relative movement in rotation between the least one of the filter members 3 and 4 and the first structure 5. Such resilient return means 7 thus present predetermined stiffness adapted to generate a return force, or a return torque, opposing the relative movement in rotation between the filter member 3 and 4 and the first structure 5.

In the invention, the filter members 3 and 4 co-operate with the resilient return means 7 to form a one-piece unit 8 that is elastically deformable during movement in rotation about an axis 14, 15 parallel to the direction Y of the filter member(s) 3 and 4 relative to the first structure 5.

Figure 2:
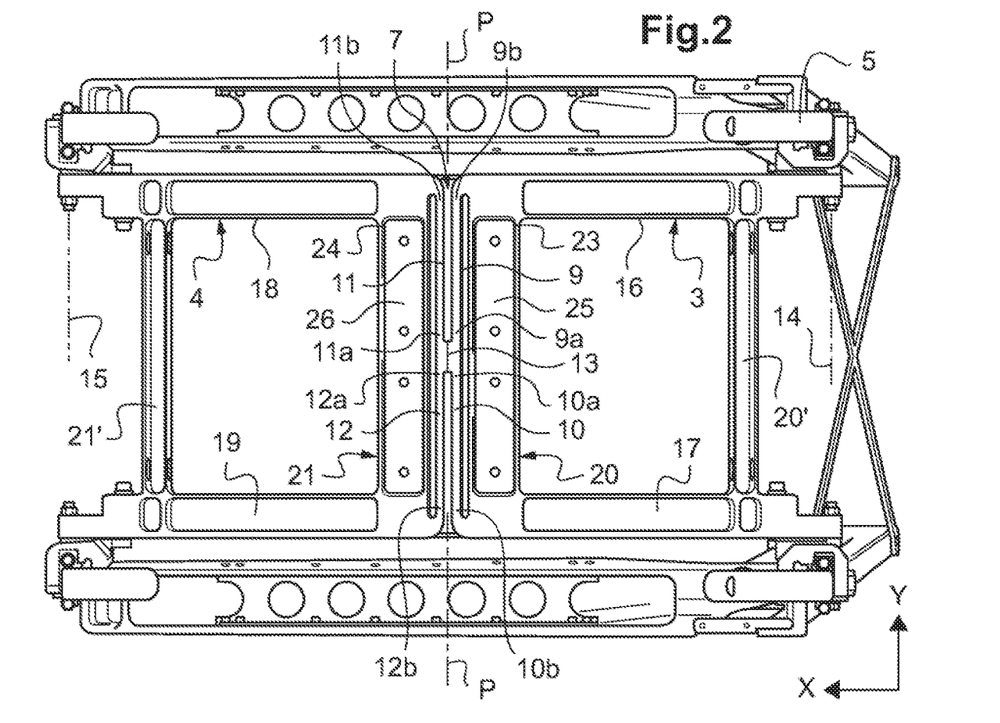
FIG. 2 is a view from beneath of the equipment fitted with the filter mechanism in the first variant in accordance with the invention.

As shown in FIG. 2 in the first variant of the filter mechanism 1, each filter member 3 and 4 may be arranged symmetrically on either side of a midplane P of symmetry parallel to a YZ plane. Furthermore, each filter member 3 and 4 has two branches 16, 18 and 17, 19 that are arranged parallel relative to the longitudinal direction X, and at least one crossbeam 20, 21 connecting together the two branches 16, 18 and 17, 19, the crossbeam 20, 21 being arranged parallel to the transverse direction Y.

In this way, the filter members 3 and 4 of FIG. 2 form two respective rigid frames that are connected together by the resilient return means 7. Each rigid frame may thus comprise two branches 16, 17 and 17, 19 respectively connected together by a first crossbeam 20, 21 arranged in the proximity of the resilient return means 7 and by a second crossbeam 20', 21' arranged in the proximity of the axis of rotation 14, 15.

Thus, the two branches 16, 18 and 17, 19 of a given filter member 3 or 4 are also connected together by the resilient return means 7 in the midplane P of symmetry.

As shown, the resilient return means 7 comprise four fins 9, 10, 11, and 12 that are connected together and arranged parallel to one another in order to define an H-shape. Each fin 9, 10, 11, and 12 thus extends in a direction parallel to the transverse direction Y between a proximal end 9a, 10a, 11a, and 12a, and a distal end 9b, 10b, 11b, and 12b.

In addition, each fin 9, 10, 11, and 12 presents capacity for deformation at least in bending or in twisting between its proximal end 9a, 10a, 11a, and 12a, and its distal end 9b, 10b, 11b, and 12b during a movement in rotation about an axis 14, 15 parallel to the direction Y of the filter member(s) 3 and 4 relative to the first structure 5.

The four fins 9, 10, 11, and 12 are secured to one another in the midplane P of symmetry via their respective proximal ends 9a, 10a, 11a, and 12a. Thus, the four fins 9, 10, 11, and 12 form a junction zone 13 having at least one cross-section that is arranged parallel relative to the midplane P of symmetry.

The respective distal ends 9b, 10b, 11b, and 12b of the four fins 9, 10, 11, and 12 are secured with the branches 16, 18 and 17, 19 of the filter members 3 and 4, thus making it possible to form the deformable one-piece unit 9 together with the filter members 3 and 4.

Furthermore, the proximal ends 9a, 10a, 11a, and 12a are secured to the junction zone 13 between the two filter members 3 and 4. These proximal ends 9a, 10a, 11a, and 12a are thus suitable for moving with rectilinear movement in translation along the elevation direction Z. Nevertheless, during the movement in rotation about the axes of rotation 14, 15 parallel to the direction Y of the filter members 3 and 4 forming two rigid frames, the respective distal ends 9b, 10b, 11b, and 12b of the four fins 9, 10, 11, and 12 describe circularly arcuate paths about the axes of rotation 14, 15.

Consequently, the differences between the rectilinear trajectories for the respective proximal ends 9a, 10a, 11a, and 12a and circularly trajectories for the respective distal ends 9b, 10b, 11b, and 12b of the four fins 9, 10, 11, and 12 then serve to generate twisting and bending stresses in the four fins 9, 10, 11, and 12, which are suitable for deforming elastically.

Such twisting stresses are thus due to the relative movements in rotation between the distal ends 9b, 10b, 11b, and 12b that pivot relative to the proximal ends 9a, 10a, 11a, and 12a. The bending stresses are generated by the relative movement along an axis parallel to the longitudinal axis X between the distal ends 9b, 10b, 11b, and 12b and the proximal ends 9a, 10a, 11a, and 12a.

Furthermore, such fins 9, 10, 11, and 12 advantageously have the same length and have a cross-section of the same shape, which may be selected in particular from the group comprising shapes that are square, rectangular, prismatic, I-shaped, H-shaped, elliptical, and round.

Figure 3:
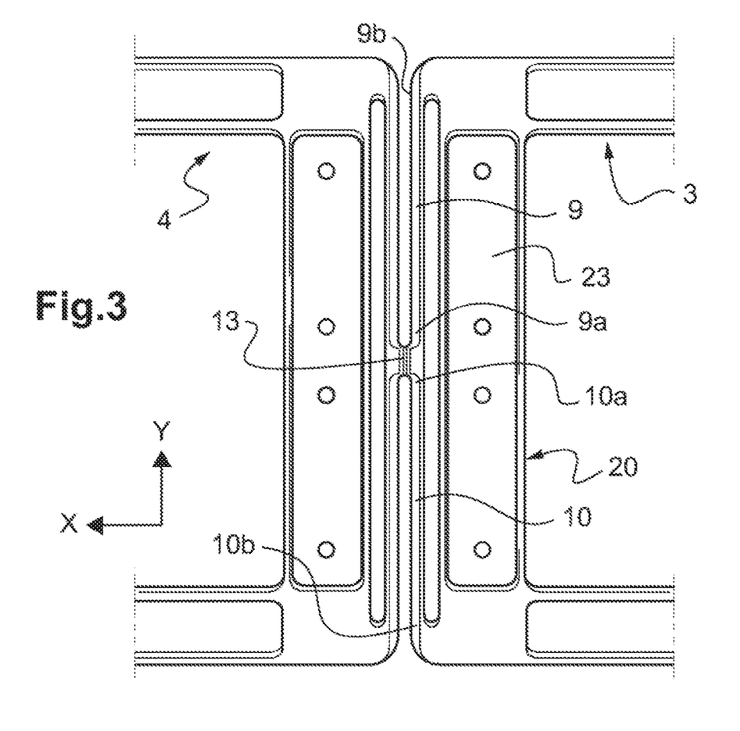
FIG. 3 is a view from beneath on a larger scale of the filter mechanism in accordance with the invention.

As shown in FIG. 3, each crossbeam 20 and 21 has a bottom face facing substantially parallel relative to the XY plane. In addition, such a bottom face of a crossbeam 20 and 21 is for arranging so that it faces a floor of the aircraft and it may include at least one recess 23 and 24 in which at least one inertial mass 25 and 26 can be fitted and held in position by fastener means such as bolts (not shown).

Figure 4:
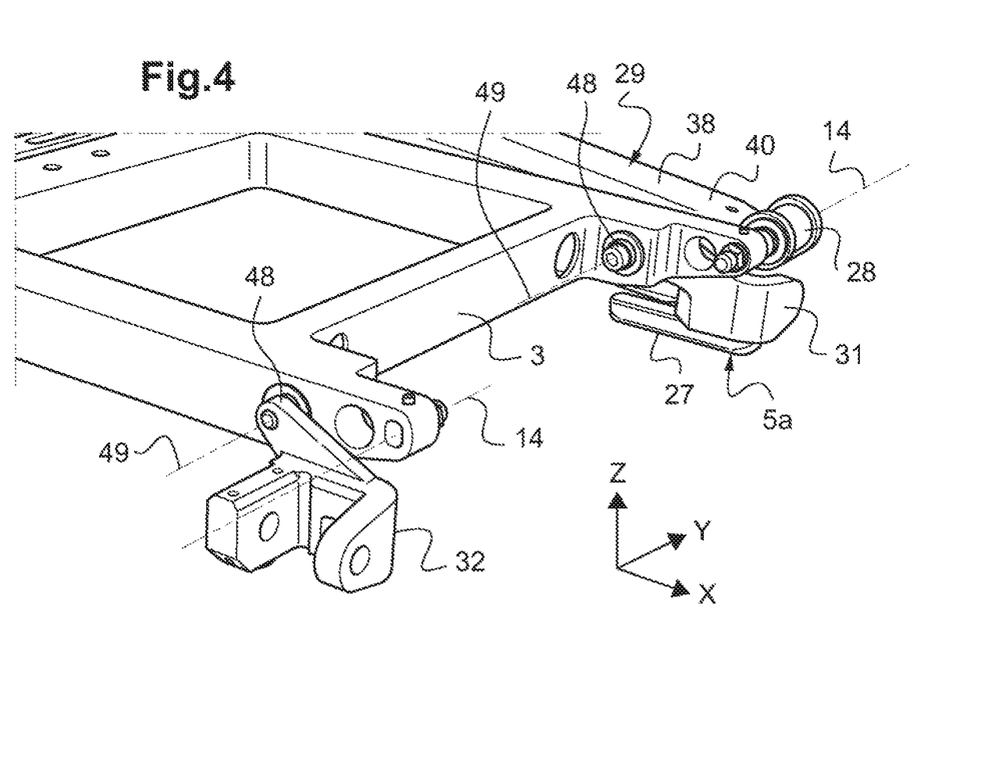
FIGS. 4 and 5 are perspective views showing the connections between the various parts constituting a filter mechanism in accordance with the invention.
Figure 5:
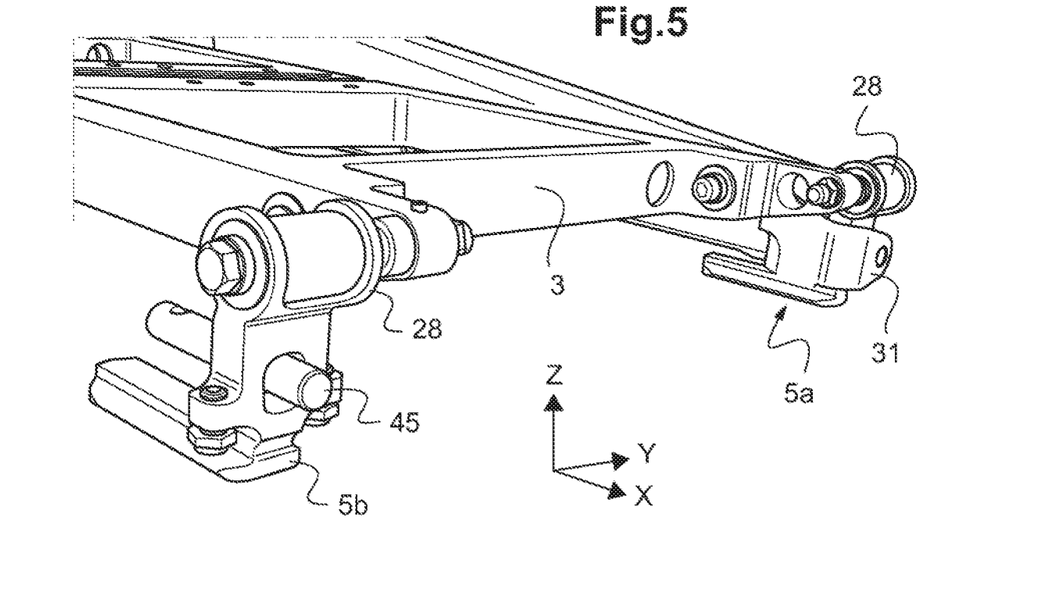

As shown in FIGS. 4 and 5, the first structure 5 has four independent feet 5a, 5b, 5c, and 5d. Each foot 5a, 5b, 5c, and 5d thus has a plane base 27 for securing via a fixed connection with a floor of the fuselage of the aircraft.

Furthermore, each foot 5a, 5b, 5c, and 5d also has first rotary guide means 28 suitable for forming all or part of the first pivot type connection having one degree of freedom to move in rotation about axes of rotation 14 and 15 between two zones on a common axis of each filter member 3 and 4 and each foot 5a, 5b, 5c, and 5d. Such first rotary guide means 28 are thus arranged coaxially with the two axes of rotation 14 and 15 corresponding to the first pivot type connections respectively for each filter member 3 and 4 relative to the four independent feet 5a, 5b, 5c, and 5d.

In addition, the horizontal spars 38 and 39 of the two brackets 29 and 30 are secured via their respective front ends 40, 41 and their respective rear ends 42, 43 with four intermediate connection parts 31, 32, 33, and 34.

Each intermediate connection part 31, 32, 33, and 34 co-operate with second rotary guide means 48 suitable for forming all or part of the second pivot type connection having one degree of freedom to move in rotation between each filter member 3 and 4 and the front and rear ends 40, 41 and 42, 43 of each horizontal spar 38, 39. Such second rotary guide means 48 are then arranged coaxially around axes of rotation 49 and 50 corresponding to the second pivot type connections having one degree of freedom to move in rotation.

In addition, such axes of rotation 14, 15, 49, and 50 are each arranged parallel relative to the transverse direction Y.

Finally, and as shown in FIG. 5, each intermediate connection part 31, 32, 33, and 34 has abutment means 45 suitable for limiting the movement in rotation of the filter members 3 and 4 relative to the four independent feet 5a, 5b, 5c, and 5d. In particular, such abutment means 45 may comprise a pin co-operating with a through orifice 46 arranged within each foot 5*a*, 5*b*, 5*c*, and 5*d*.

Such abutment means 45 may also have large capacity for plastic deformation, making it possible to absorb at least in part a fraction of the kinetic energy during an accident of the aircraft, or more generally during a hard landing.

Figure 6:
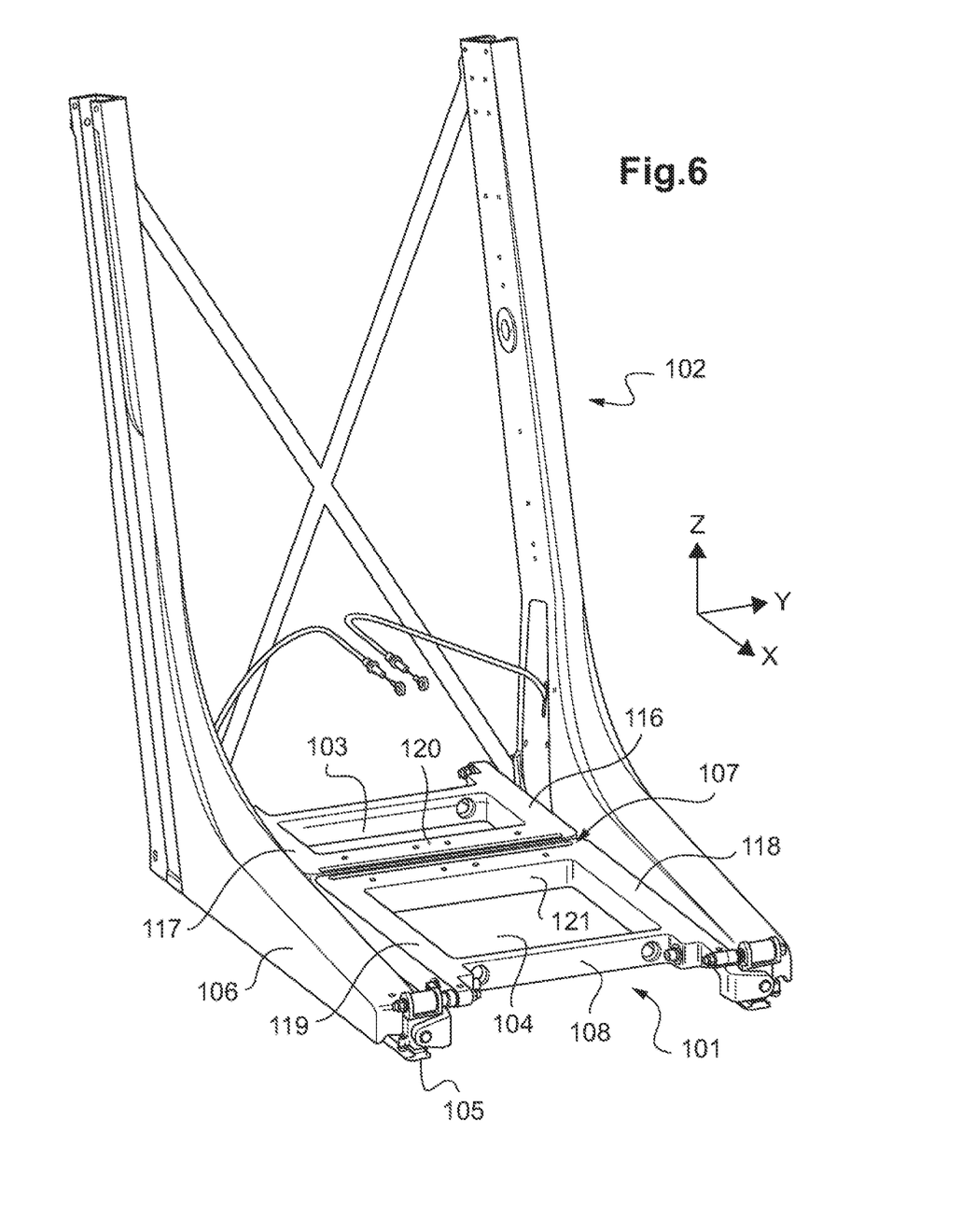
FIG. 6 is a perspective view of a piece of equipment fitted with a filter mechanism in a second variant in accordance with the invention.

As shown in FIG. 6, a second variant of a filter mechanism 101 may likewise comprise a first filter member 103 and a second filter member 104. In this variant, the first filter member 103 has two branches 116 and 117 connected together by a crossbeam 120, and the second filter member 104 has two branches 118 and 119 connected together by a crossbeam 121.

In this second variant of the filter mechanism 101, the branches 116 and 117 of the first filter member 103 are shorter than the two branches 118 and 119 of the second filter member 104.

Nevertheless, as in the first variant, such a filter mechanism 101 also has resilient return means 107 having capacity for deformation during relative movement in rotation between at least one of the filter members 103 and 104 and the first structure 105.

Likewise, the filter members 103 and 104 co-operate with the resilient return means 107 to form a one-piece unit 108 that is elastically deformable during movements in rotation of the filter member(s) 103 and 104 relative to the first structure 105.

Such a filter mechanism 101 can thus be fitted to a seat 102 for an aircraft so as to be arranged at the interface between the floor of a fuselage of the aircraft and a bucket for receiving a passenger or a pilot of the aircraft.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A vibration filter mechanism for arranging at the interface between a fuselage of an aircraft and a piece of equipment of the aircraft, the filter mechanism comprising a pair of filter members each secured respectively firstly with a first structure that is to be connected to the fuselage and secondly with a second structure of the piece of equipment, each filter member being secured with the first structure via a first pivot type connection having one degree of freedom to move in rotation and with the second structure via a second pivot type connection having one degree of freedom to move in rotation, the filter mechanism including resilient return means suitable for deforming during relative movement in rotation between at least one of the filter members and the first structure, the resilient return means presenting predetermined stiffness suitable for generating a return force opposing the relative movement in rotation between the filter member(s) and the first structure, wherein the filter members co-operate with the resilient return means to form an elastically deformable one-piece unit.

2. The mechanism according to claim 1, wherein the resilient return means comprise a group of four fins connected together and arranged parallel to one another in order to define an H-shape, each of the four fins having a proximal end) and a distal end, each fin being suitable for deforming at least in bending and in twisting between the proximal end and the distal end during the relative movement in rotation between the filter member(s) and the first structure, the four fins being secured to one another via their respective proximal ends to form a junction zone.

3. The mechanism according to claim 2, wherein the H-shape defined by the four fins is arranged in a plane parallel to a plane defined by two axes of rotation of the first pivot type connections respectively between each filter member and the first structure.

4. The mechanism according to claim 2, wherein the four fins are respectively of the same length.

5. The mechanism according to claim 2, wherein each of the four fins has a respective cross-section of shape selected from the group comprising shapes that are: square, rectangular, prismatic, I-shaped, H-shaped, elliptical, and round.

6. The mechanism according to claim 2, wherein the four fins have respective cross-sections of the same shape.

7. The mechanism according to claim 2, wherein each filter member has two branches and at least one crossbeam connecting together the two branches, the two branches also being connected together by two mutually opposite fins and forming a portion of the group of four fins, the two opposite fins being arranged on common axes on either side of the junction zone.

8. The mechanism according to claim 7, wherein the at least one crossbeam includes at least one recess, and wherein each filter member includes at least one inertial mass fitted in the at least one recess.

9. The mechanism according to claim 7, wherein the two branches of a first filter member and the two branches of a second filter member are of the same length.

10. The mechanism according to claim 7, wherein the two branches of a first filter member, and the two branches of a second filter member are of different lengths.

11. A seat constituting a piece of equipment provided with at least one mechanism according to claim 1, wherein the first structure has four independent feet, each foot including firstly a plane base for securing via a fixed connection with a floor of the fuselage, and secondly first rotary guide means suitable for forming all or part of the first pivot type connection having one degree of freedom to move in rotation between two zones on a common axis of each filter member and each foot.

12. The seat according to claim 11, wherein the second structure of the seat has two L-shaped brackets, and four intermediate connection parts, each bracket comprising firstly an upright in elevation secured by a fixed connection with a bucket of the seat, and secondly a horizontal spar secured by a fixed connection with two intermediate connection parts arranged respectively at a front end of each horizontal spar and at a rear end of each horizontal spar, the two intermediate connection parts secured to the same horizontal spar each co-operating with distinct filter members, each intermediate connection part co-operating with second rotary guide means suitable for forming all or part of the second pivot type connection having one degree of freedom to move in rotation between each filter member and the front and rear ends of each horizontal spar.

13. The seat according to claim 12, wherein each intermediate connection part includes abutment means suitable for limiting the movement in rotation of the filter members relative to the four independent feet, the abutment means of each intermediate connection part co-operating with a respective through orifice formed within each foot.

* * * * *